US012639566B2

(12) United States Patent
Gu et al.

(10) Patent No.: US 12,639,566 B2
(45) Date of Patent: May 26, 2026

(54) METHOD, SYSTEM, AND COMPUTER PROGRAM PRODUCT FOR MANAGING MODEL UPDATES

(71) Applicant: Visa International Service Association, San Francisco, CA (US)

(72) Inventors: Yu Gu, Austin, TX (US); Hongqin Song, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 1114 days.

(21) Appl. No.: 17/641,455

(22) PCT Filed: Sep. 11, 2019

(86) PCT No.: PCT/US2019/050590
§ 371 (c)(1),
(2) Date: Mar. 9, 2022

(87) PCT Pub. No.: WO2021/050061
PCT Pub. Date: Mar. 18, 2021

(65) Prior Publication Data
US 2022/0318622 A1 Oct. 6, 2022

(51) Int. Cl.
*G06N 3/08* (2023.01)
*G06N 3/063* (2023.01)

(52) U.S. Cl.
CPC .............. *G06N 3/08* (2013.01); *G06N 3/063* (2013.01)

(58) Field of Classification Search
CPC ........... G06N 3/08; G06N 3/063; G06N 20/00
See application file for complete search history.

(56) References Cited

U.S. PATENT DOCUMENTS

| | | | | |
|---|---|---|---|---|
| 10,893,107 | B1* | 1/2021 | Callari | ................ G06F 18/2115 |
| 2007/0185825 | A1 | 8/2007 | Ito et al. | |
| 2007/0233404 | A1 | 10/2007 | Lally et al. | |
| 2016/0308733 | A1 | 10/2016 | Chauhan et al. | |
| 2017/0032243 | A1 | 2/2017 | Corrado et al. | |

(Continued)

FOREIGN PATENT DOCUMENTS

| | | |
|---|---|---|
| CN | 104756463 A | 7/2015 |
| CN | 109491760 A | 3/2019 |

(Continued)

*Primary Examiner* — Tamara T Kyle
*Assistant Examiner* — William Wong
(74) *Attorney, Agent, or Firm* — The Webb Law Firm

(57) ABSTRACT

A method, system, and computer program product for managing model updates at multiple data centers hosting a same machine learning model obtain a plurality of first feature profiles input to a first implementation of a first machine learning model and a plurality of first model states determined from processing a model input with the first implementation; determine that a first model policy associated with the first machine learning model is satisfied, based on the plurality of first model states including a set of model states defined by the first model policy and the plurality of first feature profiles including a set of feature profiles defined by the first model policy; and in response to determining that the first model policy is satisfied, provide the plurality of first model states and the plurality of first feature profiles for updating at least one second implementation of the first machine learning model.

12 Claims, 4 Drawing Sheets

(56) References Cited

U.S. PATENT DOCUMENTS

| | | | |
|---|---|---|---|
| 2017/0063906 A1* | 3/2017 | Muddu | G06F 16/444 |
| 2017/0206464 A1* | 7/2017 | Clayton | G06N 3/044 |
| 2019/0197396 A1 | 6/2019 | Rajkumar et al. | |
| 2019/0220703 A1 | 7/2019 | Prakash et al. | |
| 2019/0266484 A1* | 8/2019 | Maluf | G06F 18/214 |
| 2020/0050846 A1* | 2/2020 | Sharma | G06N 5/00 |

FOREIGN PATENT DOCUMENTS

| | | |
|---|---|---|
| WO | 2006116516 A2 | 11/2006 |
| WO | 2018134587 A1 | 7/2018 |

* cited by examiner

100

300

302 — Obtain feature profiles and/or model states associated with first implementation of machine learning model 304 — Determine model policy satisfied based on feature profiles and model states 306 — Provide update for second implementation of machine learning model

METHOD, SYSTEM, AND COMPUTER PROGRAM PRODUCT FOR MANAGING MODEL UPDATES

CROSS-REFERENCE TO RELATED APPLICATION

This application is the United States national phase of International Application No. PCT/US2019/050590 filed Sep. 11, 2019, the entire disclosure of which is hereby incorporated by reference in its entirety.

BACKGROUND

1. Technical Field

This disclosure relates generally to systems, devices, products, apparatus, and methods for managing model updates, and in some non-limiting embodiments or aspects, to a method, a system, and a product for dynamic cross data center profile updates to support stateful machine learning models.

2. Technical Considerations

Many applications that receive sequential time-based inputs or events (e.g., fraud detection applications, stand-in processing applications, advertising applications, marketing applications, etc.) use stateful machine learning models, such as Recurrent Neural Networks, and/or the like, to improve performance of the applications as compared to applications that use stateless machine learning models. For example, a recurrent neural network (RNN) stores sequential information from model inputs through model states (e.g., similar to memory of a human brain, etc.). As an example, an RNN model may store multiple layers of states.

Sequential time-based inputs or events, such as transactions, and/or the like, may be processed at multiple different data centers. For example, a first input or event may be processed at a first data center, and a second input or event may be processed at a second data center. Each of these multiple data centers may provide an implementation (e.g., an instance, etc.) of a stateful machine learning model. Model states and input profiles that are synchronized and updated across the multiple data centers allow model results to remain accurate and/or consistent across the multiple data centers. However, existing database and in-memory caching systems have no mechanism for maintaining consistent model states and input profiles across multiple data centers. For example, these existing systems do not consider context of data when updating data across data centers. As an example, existing database and in-memory caching systems may treat all data equally (e.g., provide no control of when data is replicated, what data is replicated first, and in what order data is replicated). In such an example, if model states and/or input profiles for different implementations of a stateful machine learning model are updated inconsistently and/or out of order, model results may be erroneous and/or inconsistent and correct model states may be unrecoverable. Accordingly, there is a need in the art for improving management of model updates.

SUMMARY

Accordingly, provided are improved systems, devices, products, apparatus, and/or methods for managing model updates.

According to some non-limiting embodiments or aspects, provided is a computer-implemented method including: obtaining, with at least one processor, a plurality of first feature profiles input to a first implementation of a first machine learning model and a plurality of first model states determined from processing a model input including the plurality of first feature profiles with the first implementation of the first machine learning model; determining, with at least one processor, that a first model policy associated with the first machine learning model is satisfied, based on the plurality of first model states including a set of model states defined by the first model policy and the plurality of first feature profiles including a set of feature profiles defined by the first model policy; and in response to determining that the first model policy associated with the first machine learning model is satisfied, providing, with at least one processor, the plurality of first model states and the plurality of first feature profiles for updating at least one second implementation of the first machine learning model different than the first implementation of the first machine learning model.

In some non-limiting embodiments or aspects, the first machine learning model includes a first neural network including a plurality of layers, and each layer of the plurality of layers is associated with a different model state of the set of model states defined by the first model policy than each other layer of the plurality of layers.

In some non-limiting embodiments or aspects, the set of feature profiles defined by the first model policy includes a proper subset of feature profiles of the model input processed by the first implementation of the machine learning model.

In some non-limiting embodiments or aspects, the model input is associated with a sequence number, and determining that the first model policy associated with the first machine learning model is satisfied is based on the sequence number including a next sequence number in an order of sequence numbers associated with model inputs processed by the first implementation of the machine learning model.

In some non-limiting embodiments or aspects, obtaining the plurality of first model states includes receiving at least one first model state of the plurality of first model states at a first time and receiving at least one other first model state of the plurality of model states at another time subsequent to the first time, the at least one first model state including a model state of the set of model states defined by the first model policy, and the at least one other first model state including another model state of the set of model states defined by the first model policy.

In some non-limiting embodiments or aspects, obtaining the plurality of first feature profiles includes receiving at least one first feature profile of the plurality of first feature profiles at a first time and receiving at least one other first feature profile of the plurality of first feature profiles at another time subsequent to the first time, the at least one first feature profile not including a feature profile of the set of feature profiles defined by the first model policy, and the at least one other first feature profile including a feature profile of the set of feature profiles defined by the first model policy.

In some non-limiting embodiments or aspects, the method further includes: updating, with at least one processor, the at least one second implementation of the first machine learning model with the plurality of first model states and the plurality of first feature profiles.

According to some non-limiting embodiments or aspects, provided is a computing system including: one or more processors programmed and/or configured to: obtain a plurality of first feature profiles input to a first implementation of a first machine learning model and a plurality of first model states determined from processing a model input including the plurality of first feature profiles with the first implementation of the first machine learning model; determine that a first model policy associated with the first machine learning model is satisfied, based on the plurality of first model states including a set of model states defined by the first model policy and the plurality of first feature profiles including a set of feature profiles defined by the first model policy; and in response to determining that the first model policy associated with the first machine learning model is satisfied, provide the plurality of first model states and the plurality of first feature profiles for updating at least one second implementation of the first machine learning model different than the first implementation of the first machine learning model.

In some non-limiting embodiments or aspects, the first machine learning model includes a first neural network including a plurality of layers, and each layer of the plurality of layers is associated with a different model state of the set of model states defined by the first model policy than each other layer of the plurality of layers.

In some non-limiting embodiments or aspects, the set of feature profiles defined by the first model policy includes a proper subset of feature profiles of the model input processed by the first implementation of the machine learning model.

In some non-limiting embodiments or aspects, the model input is associated with a sequence number, and the one or more processors are programmed and/or configured to determine that the first model policy associated with the first machine learning model is satisfied based on the sequence number including a next sequence number in an order of sequence numbers associated with model inputs processed by the first implementation of the machine learning model.

In some non-limiting embodiments or aspects, the one or more processors are programmed and/or configured to obtain the plurality of first model states by receiving at least one first model state of the plurality of first model states at a first time and receiving at least one other first model state of the plurality of model states at another time subsequent to the first time, the at least one first model state including a model state of the set of model states defined by the first model policy, and the at least one other first model state including another model state of the set of model states defined by the first model policy.

In some non-limiting embodiments or aspects, the one or more processors are programmed and/or configured to obtain the plurality of first feature profiles by receiving at least one first feature profile of the plurality of first feature profiles at a first time and receiving at least one other first feature profile of the plurality of first feature profiles at another time subsequent to the first time, the at least one first feature profile not including a feature profile of the set of feature profiles defined by the first model policy, and the at least one other first feature profile including a feature profile of the set of feature profiles defined by the first model policy.

In some non-limiting embodiments or aspects, the computing system further includes: a first data center programmed and/or configured to provide the first implementation of the first machine learning model; and at least one second data center programmed and/or configured to provide the at least one second implementation of the first machine learning model, wherein the one or more processors are further programmed and/or configured to transmit, to the at least one second data center, the plurality of first model states and the plurality of first feature profiles for updating the at least one second implementation of the first machine learning model at the at least one second data center.

According to some non-limiting embodiments or aspects, provided is a computer program product including at least one non-transitory computer-readable medium including program instructions that, when executed by at least one processor, cause the at least one processor to: obtain a plurality of first feature profiles input to a first implementation of a first machine learning model and a plurality of first model states determined from processing a model input including the plurality of first feature profiles with the first implementation of the first machine learning model; determine that a first model policy associated with the first machine learning model is satisfied, based on the plurality of first model states including a set of model states defined by the first model policy and the plurality of first feature profiles including a set of feature profiles defined by the first model policy; and in response to determining that the first model policy associated with the first machine learning model is satisfied, provide the plurality of first model states and the plurality of first feature profiles for updating at least one second implementation of the first machine learning model different than the first implementation of the first machine learning model.

In some non-limiting embodiments or aspects, the first machine learning model includes a first neural network including a plurality of layers, and each layer of the plurality of layers is associated with a different model state of the set of model states defined by the first model policy than each other layer of the plurality of layers.

In some non-limiting embodiments or aspects, the set of feature profiles defined by the first model policy includes a proper subset of feature profiles of the model input processed by the first implementation of the machine learning model.

In some non-limiting embodiments or aspects, the model input is associated with a sequence number, and the instructions cause the at least one processor to determine that the first model policy associated with the first machine learning model is satisfied based on the sequence number including a next sequence number in an order of sequence numbers associated with model inputs processed by the first implementation of the machine learning model.

In some non-limiting embodiments or aspects, the instructions cause the at least one processor to obtain the plurality of first model states by receiving at least one first model state of the plurality of first model states at a first time and receiving at least one other first model state of the plurality of model states at another time subsequent to the first time, the at least one first model state including a model state of the set of model states defined by the first model policy, and the at least one other first model state including another model state of the set of model states defined by the first model policy.

In some non-limiting embodiments or aspects, the instructions cause the at least one processor to obtain the plurality of first feature profiles by receiving at least one first feature profile of the plurality of first feature profiles at a first time and receiving at least one other first feature profile of the plurality of first feature profiles at another time subsequent to the first time, the at least one first feature profile not including a feature profile of the set of feature profiles defined by the first model policy, and the at least one other first feature profile including a feature profile of the set of feature profiles defined by the first model policy.

Further non-limiting embodiments or aspects are set forth in the following numbered clauses:

Clause 1. A computer-implemented method comprising: obtaining, with at least one processor, a plurality of first feature profiles input to a first implementation of a first machine learning model and a plurality of first model states determined from processing a model input including the plurality of first feature profiles with the first implementation of the first machine learning model; determining, with at least one processor, that a first model policy associated with the first machine learning model is satisfied, based on the plurality of first model states including a set of model states defined by the first model policy and the plurality of first feature profiles including a set of feature profiles defined by the first model policy; and in response to determining that the first model policy associated with the first machine learning model is satisfied, providing, with at least one processor, the plurality of first model states and the plurality of first feature profiles for updating at least one second implementation of the first machine learning model different than the first implementation of the first machine learning model.

Clause 2. The computer-implemented method of clause 1, wherein the first machine learning model comprises a first neural network including a plurality of layers, and wherein each layer of the plurality of layers is associated with a different model state of the set of model states defined by the first model policy than each other layer of the plurality of layers.

Clause 3. The computer-implemented method of clauses 1 or 2, wherein the set of feature profiles defined by the first model policy includes a proper subset of feature profiles of the model input processed by the first implementation of the machine learning model.

Clause 4. The computer-implemented method of any of clauses 1-3, wherein the model input is associated with a sequence number, and wherein determining that the first model policy associated with the first machine learning model is satisfied is based on the sequence number including a next sequence number in an order of sequence numbers associated with model inputs processed by the first implementation of the machine learning model.

Clause 5. The computer-implemented method of any of clauses 1-4, wherein obtaining the plurality of first model states includes receiving at least one first model state of the plurality of first model states at a first time and receiving at least one other first model state of the plurality of model states at another time subsequent to the first time, wherein the at least one first model state includes a model state of the set of model states defined by the first model policy, and wherein the at least one other first model state includes another model state of the set of model states defined by the first model policy.

Clause 6. The computer-implemented method of any of clauses 1-5, wherein obtaining the plurality of first feature profiles includes receiving at least one first feature profile of the plurality of first feature profiles at a first time and receiving at least one other first feature profile of the plurality of first feature profiles at another time subsequent to the first time, wherein the at least one first feature profile does not include a feature profile of the set of feature profiles defined by the first model policy, and wherein the at least one other first feature profile includes a feature profile of the set of feature profiles defined by the first model policy.

Clause 7. The computer-implemented method of any of clauses 1-6, further comprising: updating, with at least one processor, the at least one second implementation of the first machine learning model with the plurality of first model states and the plurality of first feature profiles.

Clause 8. A computing system comprising: one or more processors programmed and/or configured to: obtain a plurality of first feature profiles input to a first implementation of a first machine learning model and a plurality of first model states determined from processing a model input including the plurality of first feature profiles with the first implementation of the first machine learning model; determine that a first model policy associated with the first machine learning model is satisfied, based on the plurality of first model states including a set of model states defined by the first model policy and the plurality of first feature profiles including a set of feature profiles defined by the first model policy; and in response to determining that the first model policy associated with the first machine learning model is satisfied, provide the plurality of first model states and the plurality of first feature profiles for updating at least one second implementation of the first machine learning model different than the first implementation of the first machine learning model.

Clause 9. The computing system of clause 8, wherein the first machine learning model comprises a first neural network including a plurality of layers, and wherein each layer of the plurality of layers is associated with a different state of the set of model states defined by the first model policy than each other layer of the plurality of layers.

Clause 10. The computing system of clauses 8 or 9, wherein the set of feature profiles defined by the first model policy includes a proper subset of feature profiles of the model input processed by the first implementation of the machine learning model.

Clause 11. The computing system of any of clauses 8-10, wherein the model input is associated with a sequence number, and wherein the one or more processors are programmed and/or configured to determine that the first model policy associated with the first machine learning model is satisfied based on the sequence number including a next sequence number in an order of sequence numbers associated with model inputs processed by the first implementation of the machine learning model.

Clause 12. The computing system of any of clauses 8-11, wherein the one or more processors are programmed and/or configured to obtain the plurality of first model states by receiving at least one first model state of the plurality of first model states at a first time and receiving at least one other first model state of the plurality of model states at another time subsequent to the first time, wherein the at least one first model state includes a model state of the set of model states defined by the first model policy, and wherein the at least one other first model state includes another model state of the set of model states defined by the first model policy.

Clause 13. The computing system of any of clauses 8-12, wherein the one or more processors are programmed and/or configured to obtain the plurality of first feature profiles by receiving at least one first feature profile of the plurality of first feature profiles at a first time and receiving at least one other first feature profile of the plurality of first feature profiles at another time subsequent to the first time, wherein the at least one first feature profile does not include a feature profile of the set of feature profiles defined by the first model policy, and wherein the at least one other first feature profile includes a feature profile of the set of feature profiles defined by the first model policy.

Clause 14. The computing system of any of clauses 8-13, further comprising: a first data center programmed and/or configured to provide the first implementation of the first machine learning model; and at least one second data center programmed and/or configured to provide the at least one second implementation of the first machine learning model, wherein the one or more processors are further programmed and/or configured to transmit, to the at least one second data center, the plurality of first model states and the plurality of first feature profiles for updating the at least one second implementation of the first machine learning model at the at least one second data center.

Clause 15. A computer program product comprising at least one non-transitory computer-readable medium including program instructions that, when executed by at least one processor, cause the at least one processor to: obtain a plurality of first feature profiles input to a first implementation of a first machine learning model and a plurality of first model states determined from processing a model input including the plurality of first feature profiles with the first implementation of the first machine learning model; determine that a first model policy associated with the first machine learning model is satisfied, based on the plurality of first model states including a set of model states defined by the first model policy and the plurality of first feature profiles including a set of feature profiles defined by the first model policy; and in response to determining that the first model policy associated with the first machine learning model is satisfied, provide the plurality of first model states and the plurality of first feature profiles for updating at least one second implementation of the first machine learning model different than the first implementation of the first machine learning model.

Clause 16. The computer program product of clause 15, wherein the first machine learning model comprises a first neural network including a plurality of layers, and wherein each layer of the plurality of layers is associated with a different model state of the set of model states defined by the first model policy than each other layer of the plurality of layers.

Clause 17. The computer program product of clauses 15 or 16, wherein the set of feature profiles defined by the first model policy includes a proper subset of feature profiles of the model input processed by the first implementation of the machine learning model.

Clause 18. The computer program product of any of clauses 15-17, wherein the model input is associated with a sequence number, and wherein the instructions cause the at least one processor to determine that the first model policy associated with the first machine learning model is satisfied based on the sequence number including a next sequence number in an order of sequence numbers associated with model inputs processed by the first implementation of the machine learning model.

Clause 19. The computer program product of any of clauses 15-18, wherein the instructions cause the at least one processor to obtain the plurality of first model states by receiving at least one first model state of the plurality of first model states at a first time and receiving at least one other first model state of the plurality of model states at another time subsequent to the first time, wherein the at least one first model state includes a model state of the set of model states defined by the first model policy, and wherein the at least one other first model state includes another model state of the set of model states defined by the first model policy.

Clause 20. The computer program product of any of clauses 15-19, wherein the instructions cause the at least one processor to obtain the plurality of first feature profiles by receiving at least one first feature profile of the plurality of first feature profiles at a first time and receiving at least one other first feature profile of the plurality of first feature profiles at another time subsequent to the first time, wherein the at least one first feature profile does not include a feature profile of the set of feature profiles defined by the first model policy, and wherein the at least one other first feature profile includes a feature profile of the set of feature profiles defined by the first model policy.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments or aspects that are illustrated in the accompanying schematic figures, in which.

DETAILED DESCRIPTION

Figure 1A:
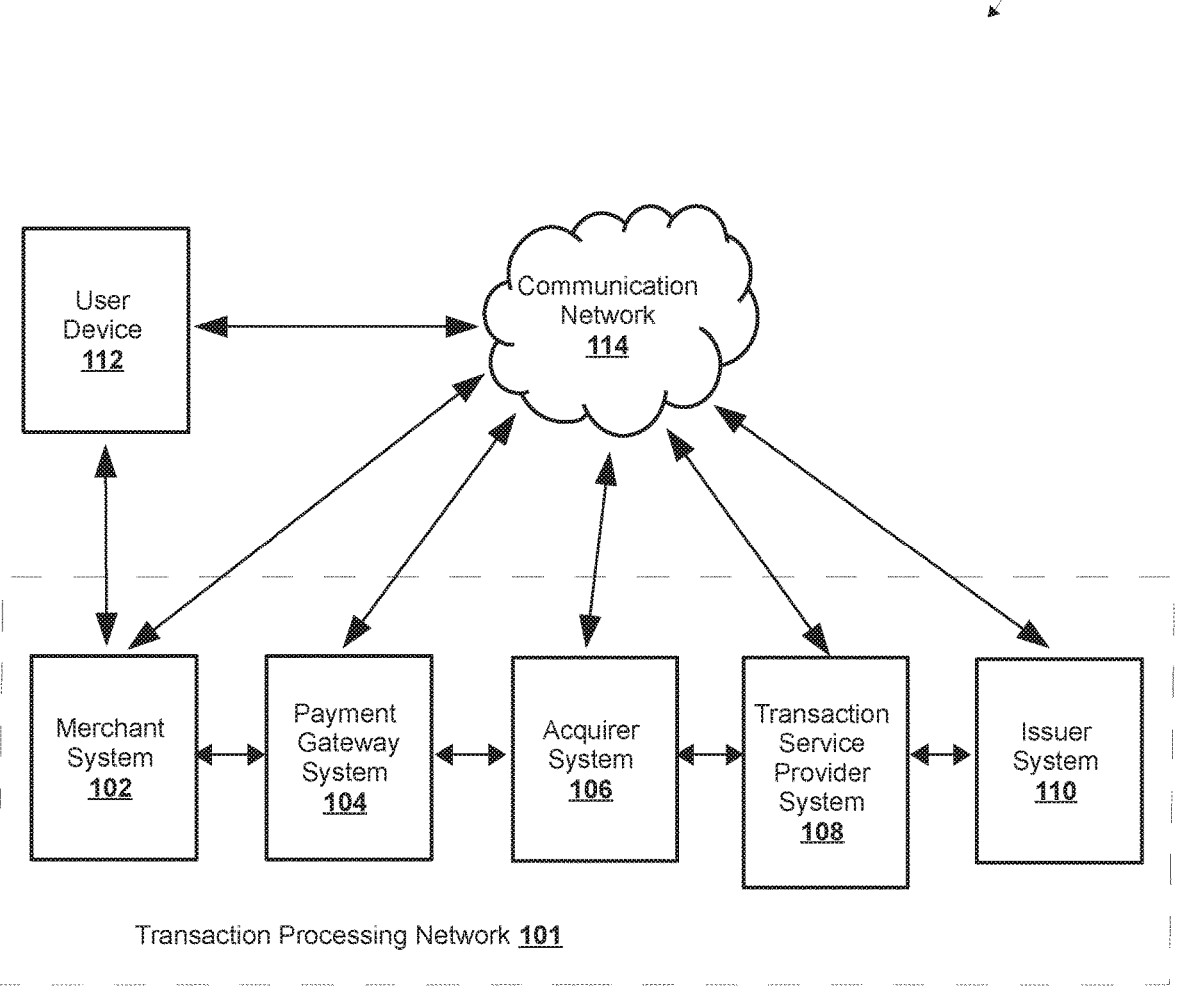
FIG. 1A is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing system executing one or more software applications. A transaction processing system may include one or more server computers with one or more processors and, in some non-limiting embodiments or aspects, may be operated by or on behalf of a transaction service provider.

As used herein, the term "account identifier" may include one or more Primary Account Numbers (PAN), tokens, or other identifiers (e.g., a globally unique identifier (GUID), a universally unique identifier (UUID), etc.) associated with a customer account of a user (e.g., a customer, a consumer, and/or the like). The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a personal account number (PAN), to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides products and/or services, or access to products and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" or "computer device" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" or "payment device" may refer to an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant (PDA), a security card, an access card, a wireless terminal, and/or a transponder, as examples. The portable financial device may include a volatile or a non-volatile memory to store information, such as an account identifier and/or a name of the account holder.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system. As used herein, the term "data center" may include one or more servers, or other computing devices, and/or databases.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

Provided are improved systems, devices, products, apparatus, and/or methods for managing model updates.

Non-limiting embodiments or aspects of the present disclosure are directed to systems, methods, and computer program products for managing model updates that obtain a plurality of first feature profiles input to a first implementation of a first machine learning model and a plurality of first model states determined from processing a model input including the plurality of first feature profiles with the first implementation of the first machine learning model; determine that a first model policy associated with the first machine learning model is satisfied, based on the plurality of first model states including a set of model states defined by the first model policy and the plurality of first feature profiles including a set of feature profiles defined by the first model policy; and in response to determining that the first model policy associated with the first machine learning model is satisfied, provide the plurality of first model states and the plurality of first feature profiles for updating at least one second implementation of the first machine learning model different than the first implementation of the first machine learning model. In this way, non-limiting embodiments or aspects of the present disclosure may provide for dynamic cross data center profile updates that use model states, feature profile priorities, and/or model input ordering to support stateful machine learning models to enable more accurate and consistent model results and improved synchronized data across multiple implementations of a machine learning model (e.g., across multiple data centers, etc.)

Referring now to FIG. 1A, FIG. 1A is a diagram of an example environment 100 in which devices, systems, methods, and/or products described herein, may be implemented. As shown in FIG. 1A, environment 100 includes transaction processing network 101, which may include merchant system 102, payment gateway system 104, acquirer system 106, transaction service provider system 108, and/or issuer system 110, user device 112, and/or communication network 114. Transaction processing network 101, merchant system 102, payment gateway system 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 (e.g., via communication network 114, etc.) and/or communicating information and/or data to payment gateway system 104, acquirer system 106, transaction service provider system 108, issuer system 110, and/or user device 112 (e.g., via communication network 114, etc.). Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 (e.g., via communication network 114, etc.) and/or communicating information and/or data to merchant system 102, acquirer system 106, transaction service provider system 108, issuer system 110, and/or user device 112 (e.g., via communication network 114, etc.). For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 (e.g., via communication network 114, etc.) and/or communicating information and/or data to merchant system 102, payment gateway system 104, transaction service provider system 108, issuer system 110, and/or user device 112 (e.g., via communication network 114, etc.). For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 (e.g., via communication network 114, etc.) and/or communicating information and/or data to merchant system 102, payment gateway system 104, acquirer system 106, issuer system 110, and/or user device 112 (e.g., via communication network 114, etc.). For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider 108 may include and/or access one or more one or more internal and/or external databases including account data, transaction data, feature profiles, model states, model policies, sequence numbers, and/or the like.

Issuer system 110 may include one or more devices capable of receiving information and/or data from merchant system 102, payment gateway system 104, acquirer system 106, transaction service provider system 108, and/or user device 112 (e.g., via communication network 114, etc.) and/or communicating information and/or data to merchant system 102, payment gateway system 104, acquirer system 106, transaction service provider system 108, and/or user device 112 (e.g., via communication network 114, etc.). For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 may include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 may process (e.g., receive, initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 (e.g., via communication network 114, etc.) and/or communicating information and/or data to merchant system 102, payment gateway system 104, acquirer system 106, transaction service provider system 108, and/or issuer system 110 (e.g., via communication network 114, etc.). For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, and/or the like) stored and/or executed on user device 112.

Communication network 114 may include one or more wired and/or wireless networks. For example, communication network 114 may include a cellular network (e.g., a long-term evolution (LTE) network, a third generation (3G) network, a fourth generation (4G) network, a fifth generation network (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

Figure 1B:
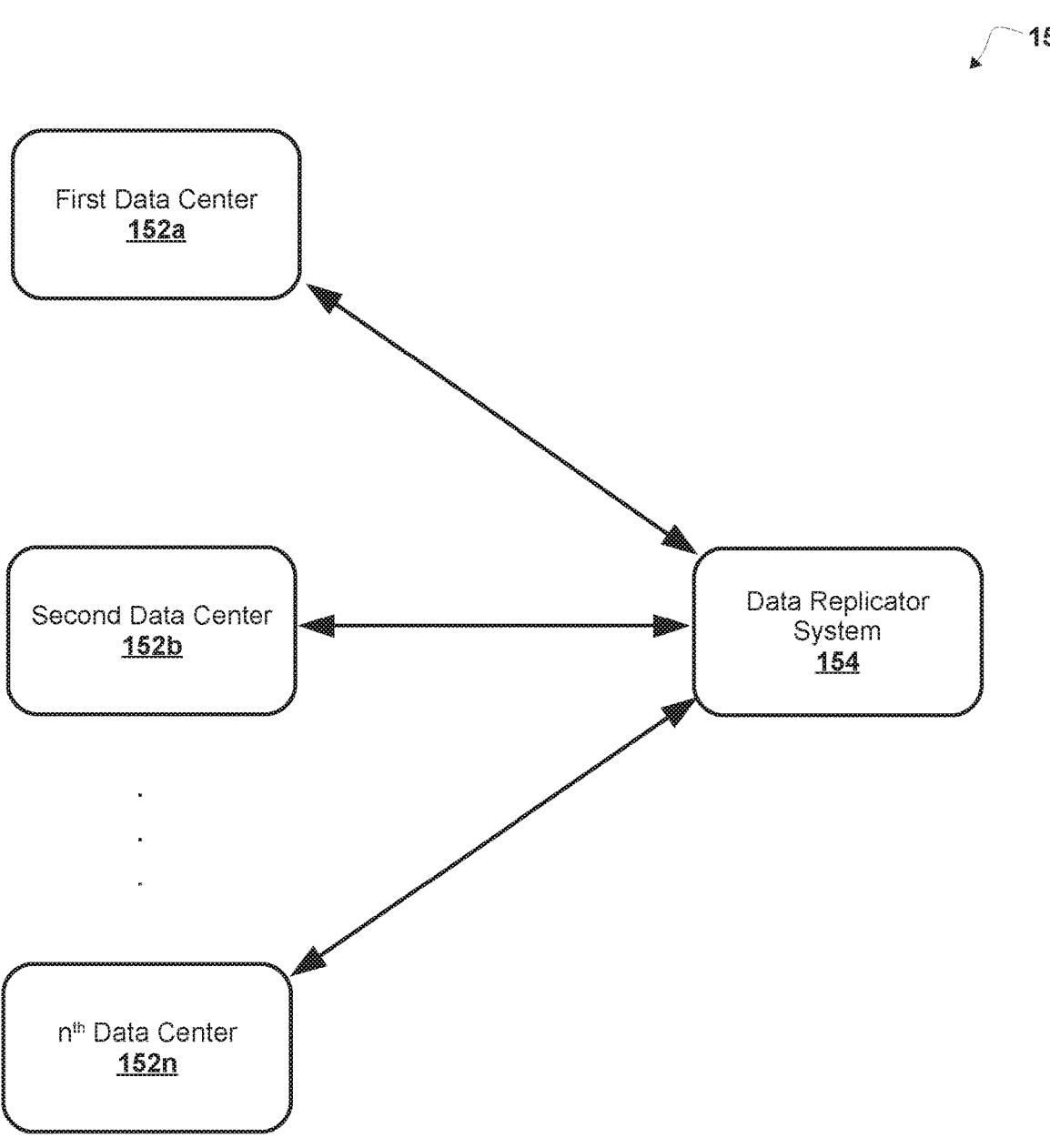
FIG. 1B is a diagram of non-limiting embodiments or aspects of a system for managing model updates.

Referring now to FIG. 1B, FIG. 1B is a diagram of non-limiting embodiments or aspects of a system 150 for maintaining managing model updates. System 150 may correspond to one or more devices of transaction processing network 101, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.). As shown in FIG. 1B, system 150 includes a plurality of data centers, such as first data center 152a, second data center 152b, and/or n$^{th}$ data center 152n, and/or data replicator system 154. First data center 152a, second data center 152b, n$^{th}$ data center 152n, and/or data replicator system 154 may be implemented within a single device and/or system or distributed across multiple devices and/or systems (e.g., across multiple data centers and/or systems, etc.). For example, each data center of the plurality of data centers 152a, 152b, 152n may include an implementation of data replicator system 154, or a single data replicator system 154 may receive messages including model states and/or feature profile inputs from each of the plurality of data center 152a, 152b, 152n. System 150 may be programmed and/or configured to manage model updates across the data centers 152a, 152b, and/or 152n for stateful machine learning models and is described in more detail herein below with respect to FIGS. 3 and 4. For example, first data center 152a may be programmed and/or configured to provide a first implementation of a machine learning model, second data center 152b may be programmed and/or configured to provide a second implementation of the machine learning model, and/or n$^{th}$ data center 152n may be programmed and/or configured to provide an n$^{th}$ implementation of the machine learning model. In some non-limiting embodiments or aspects, one or more of data center 152a, 152b, and 152n may be programmed and/or configured to provide one or more implementation of a plurality of different machine learning models (e.g., a first machine learning mode, a second machine learning model, a fraud detection model, a stand-in processing model, a marketing model, an advertising model, etc.).

The number and arrangement of devices and systems shown in FIGS. 1A and 1B is provided as an example. There may be additional devices and/or systems, fewer devices and/or systems, different devices and/or systems, or differently arranged devices and/or systems than those shown in FIGS. 1A and 1B. Furthermore, two or more devices and/or systems shown in FIGS. 1A and 1B may be implemented within a single device and/or system, or a single device and/or or system shown in FIGS. 1A and 1B may be implemented as multiple, distributed devices and/or systems. Additionally, or alternatively, a set of devices and/or systems (e.g., one or more devices or systems) of environment 100 may perform one or more functions described as being performed by another set of devices and/or systems of environment 100.

Figure 2:
FIG. 2 is a diagram of non-limiting embodiments or aspects of components of one or more devices and/or one or more systems of FIGS. 1A and 1B.
Figure 2:
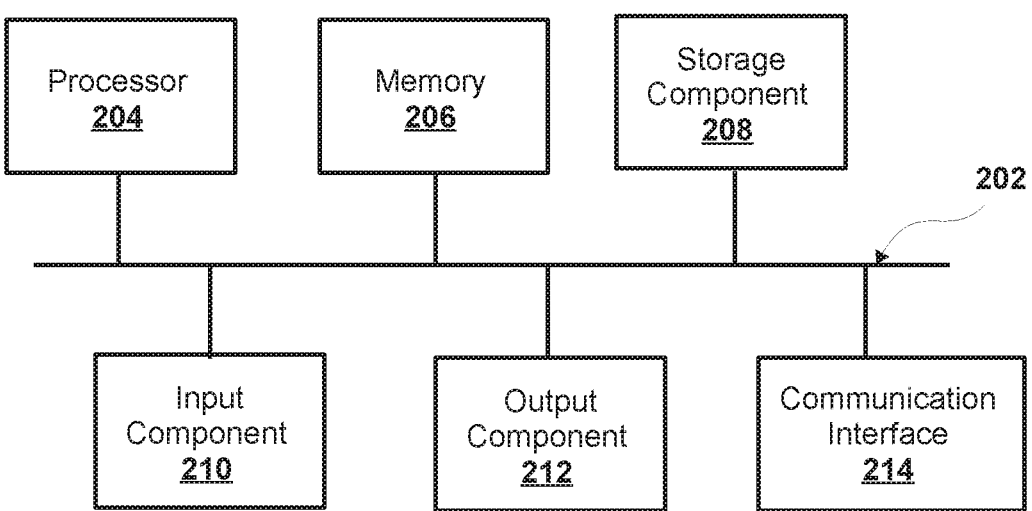

Referring now to FIG. 2, FIG. 2 is a diagram of example components of a device 200. Device 200 may correspond to one or more devices of transaction processing network 101, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.). In some non-limiting embodiments or aspects, one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or one or more devices of communication network 114 may include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208. For example, transaction service provider system 108 may include and/or access one or more internal and/or external databases that store transaction data associated with transactions processed and/or being processed in transaction processing network 101 (e.g., prior or historical transactions processed via transaction service provider system 108, etc.), account data, input data, output data, update data, model inputs, feature profiles, model states, model policies, and/or the like.

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
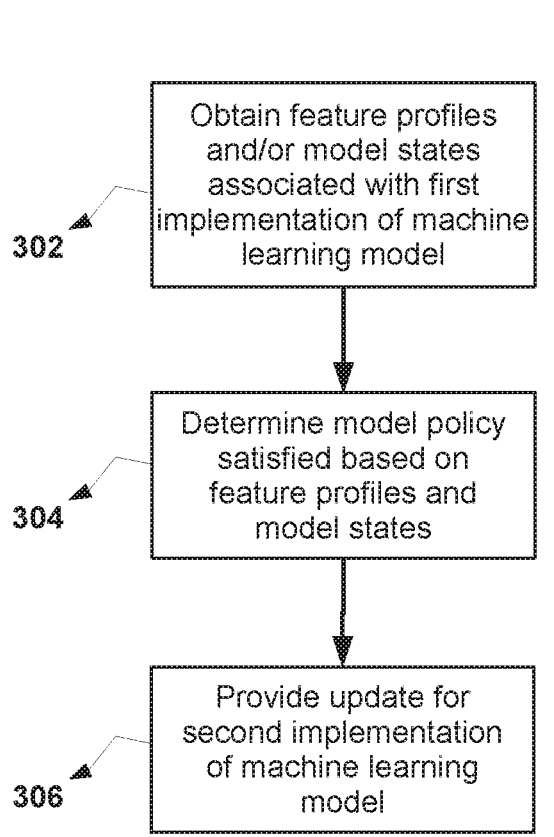
FIG. 3 is a flowchart of non-limiting embodiments or aspects of a process for managing model updates.

Referring now to FIG. 3, FIG. 3 is a flowchart of non-limiting embodiments or aspects of a process 300 for managing model updates. In some non-limiting embodiments or aspects, one or more of the steps of process 300 may be performed (e.g., completely, partially, etc.) by transaction service provider system 108 (e.g., one or more devices of transaction service provider system 108, etc.). In some non-limiting embodiments or aspects, one or more of the steps of process 300 may be performed (e.g., completely, partially, etc.) by another device or a group of devices separate from or including transaction service provider system, such as merchant system 102 (e.g., one or more devices of merchant system 102), payment gateway system 104 (e.g., one or more devices of payment gateway system 104), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 3, at step 302, process 300 includes obtaining feature profiles and/or model states associated with a first implementation of a machine learning model. For example, transaction service provider system 108 (e.g., data replicator system 154, etc.) may obtain feature profiles and/or model states associated with a first implementation of a machine learning model. As an example, transaction service provider system 108 (e.g., data replicator system 154, etc.) may obtain a plurality of first feature profiles input to a first implementation of a first machine learning model (e.g., at first data center 152a, etc.) and a plurality of first model states determined from processing a model input including the plurality of first feature profiles with the first implementation of the first machine learning model (e.g., at first data center 152a, etc.).

In some non-limiting embodiments or aspects, a model input may include feature profiles input and/or configured to be input to an implementation of a machine learning model. For example, a model input may include an event or input processed or to be processed by an implementation of a machine learning model. As an example, a model input may be associated with a transaction received, initiated, executed, and/or processed in transaction processing network 101. In such an example, a feature profile may include transaction data associated with a transaction.

In some non-limiting embodiments or aspects, transaction data may include parameters associated with a transaction, such as an account identifier (e.g., a PAN, etc.), a transaction amount, a transaction date and time, a type of products and/or services associated with the transaction, a conversion rate of currency, a type of currency, a merchant type, a merchant name, a merchant location, a transaction approval (and/or decline) rate, and/or the like. In some non-limiting embodiments or aspects, transaction data may include account data associated with an account identifier, such as a total transaction amount within a previous time period (e.g., within a previous 24 hours, etc.) associated with the account identifier, a model result or output from an implementation of a machine learning model processing a previous transaction associated with the account identifier, and/or other like parameters that may be updated and/or modified in response a transaction associated with the account identifier or other account identifiers being processed in transaction processing network 101 (e.g., processed by an implementation of a machine learning model, etc.). For example, a machine learning model may be programmed and/or configured to process feature profiles associated with a transaction to generate an output or prediction for a fraud detection application, a stand-in processing application, an advertising application, a marketing application, and/or the like.

In some non-limiting embodiments or aspects, a machine learning model includes a neural network including a plurality of layers, and each layer of the plurality of layers is associated with a different model state of a set of model states defined by a model policy associated with the machine learning model than each other layer of the plurality of layers. For example, a first machine learning model may include a first neural network including a plurality of layers in which each layer of the plurality of layers of the first neural network may be associated with a different model state of a set of model states defined by a first model policy associated with the first machine learning model than each other layer of the plurality of layers of the first neural network, and a second machine learning model different than the first machine learning model may include a second neural network including a plurality of layers in which each layer of the plurality of layers of the second neural network may be associated with a different model state of a set of model states defined by a second model policy associated with the second machine learning layer than each other layer of the plurality of layers of the first neural network. As an example, a model state may include a vector of a fixed length that selectively stores transformed model inputs over time, and the model state may define one or more parameters and/or weights for a layer of a neural network associated with the model state. In such an example, a neural network including a plurality of layers may be associated with a plurality of model states that correspond to the plurality of layers.

In some non-limiting embodiments or aspects, a plurality of data centers may provide a plurality of implementations of one or more machine learning models. For example, and referring again to FIG. 1B, first data center 152a may provide a first implementation of a first machine learning model, second data center 152b may provide a second implementation of the first machine learning model, and/or n$^{th}$ data center 152n may provide an n$^{th}$ implementation of the first machine learning model. In some non-limiting embodiments or aspects, one or more of first data center 152a, second data center 152b, and third data center 152n may provide implementations of a plurality of different machine learning models (e.g., a first implementation of a first machine learning model at first data center 152a, a first implementation of a second machine learning model at first data center 152a, a second implementation of the first machine learning model at second data center 152b, a second implementation of the second machine learning model at second data center 152b, etc.). In such examples, transaction service provider system 108 (e.g., data replicator system 154, etc.) may receive model states and profile inputs associated with the plurality of implementations of the one or more machine learning models from the plurality of data centers 152a, 152b, 152n and may manage updates of model states and profile inputs across each implementation of each machine learning model at each of plurality of data centers 152a, 152b, 152n.

As shown in FIG. 3, at step 304, process 300 includes determining that a model policy is satisfied based on feature profiles and model states. For example, transaction service provider system 108 (e.g., data replicator system 154, etc.) may determine that a model policy is satisfied based on feature profiles and model states. As an example, transaction service provider system 108 (e.g., data replicator system 154, etc.) may determine that a first model policy associated with the first machine learning model is satisfied, based on the plurality of first model states including a set of model states defined by the first model policy and the plurality of first feature profiles including a set of feature profiles defined by the first model policy.

In some non-limiting embodiments or aspects, a model policy defines at least one of: a set of model states associated with a machine learning model, a set of feature profiles associated with the machine learning model, an order of sequence numbers associated with model inputs processed by an implementation of the machine learning model, or any combination thereof. For example, transaction service provider system 108 (e.g., data replicator system 154, etc.) may determine that a model policy is satisfied if transaction service provider system 108 (e.g., data replicator system 154, etc.) receives (e.g., has access to, is capable of providing, etc.) model states associated with an implementation of a machine learning model that include, correspond to, or match each model state of a set of model states defined by a model policy associated with that machine learning model, feature profiles associated with the implementation of the machine learning model that include, correspond to, or match each feature profile defined by the model policy associated with that machine learning model, and a sequence number for a model input (e.g., a transaction identifier or timestamp associated with a transaction, etc.) associated with the received model states and/or feature profiles that includes, corresponds to, or matches a next sequence number in an order of sequence numbers associated with model inputs processed by the implementation of that machine learning model. As an example, transaction service provider system 108 (e.g., data replicator system 154, etc.) may store and/or use a same model policy for each implementation of the same machine learning model. In such an example, transaction service provider system 108 (e.g., data replicator system 154, etc.) may store and/or use a different model policy for each different machine learning model of a plurality of different machine learning models.

In some non-limiting embodiments or aspects, a set of model states defined by a model policy associated with a machine learning model may include a model state that corresponds to or matches each layer of a neural network of the machine learning model. For example, a model policy associated with a machine learning model may require transaction service provider system 108 (e.g., data replicator system 154, etc.) to receive a model state from an implementation of the machine learning model that corresponds to or matches each layer of that machine learning model before transaction service provider system 108 (e.g., data replicator system 154, etc.) can provide an update to another implementation of the same machine learning model based on any of the model states (and/or feature profiles) received from that implementation of the same machine learning model. As an example, transaction service provider system 108 (e.g., data replicator system 154, etc.) may delay providing and/or updating the other implementation of the same machine learning model with any of the received model states (and/or feature profiles) until the model policy associated with the machine learning model is satisfied. In such an example, transaction service provider system 108 (e.g., data replicator system 154, etc.) may obtain a plurality of first model states by receiving at least one first model state of the plurality of first model states at a first time and receiving at least one other first model state of the plurality of model states at another time subsequent to the first time, the at least one first model state including a model state of the set of model states defined by the first model policy, and the at least one other first model state including another model state of the set of model states defined by the first model policy.

In some non-limiting embodiments or aspects, a set of feature profiles defined by a model policy includes a proper subset of feature profiles of a model input processed by an implementation of a machine learning model (e.g., a proper subset of feature profiles of a feature input layer of the machine learning model, etc.). For example, a model policy associated with a machine learning model may require transaction service provider system 108 (e.g., data replicator system 154, etc.) to receive a feature profile from an implementation of the machine learning model that corresponds to or matches each feature profile of the proper subset of feature profiles before transaction service provider system 108 (e.g., data replicator system 154, etc.) can provide an update to another implementation of the same machine learning model based on any of the feature profiles (and/or model states) received from that implementation of the same machine learning model. As an example, transaction service provider system 108 (e.g., data replicator system 154, etc.) may delay providing and/or updating the other implementation of the same machine learning model with any of the received feature profiles (and/or model states) until the model policy associated with the machine learning model is satisfied. In such an example, a model policy may define a priority of feature profiles associated with a machine learning model (e.g., an amount that a feature profile contributes to an accuracy of the machine learning model, etc.) by requiring higher priority feature profiles to be received or provided to satisfy the model policy, while allowing the model policy to be satisfied by receipt of the higher priority feature profiles even if lower priority feature profiles have not been received or cannot be provided. In such an example, transaction service provider system 108 (e.g., data replicator system 154, etc.) may obtain the plurality of first feature profiles including receiving at least one first feature profile of the plurality of first feature profiles at a first time and receiving at least one other first feature profile of the plurality of first feature profiles at another time subsequent to the first time, wherein the at least one first feature profile does not include a feature profile of the set of feature profiles defined by the first model policy, and wherein the at least one other first feature profile includes a feature profile of the set of feature profiles defined by the first model policy.

However, non-limiting embodiments or aspects are not limited to a set of feature profiles defined by a model policy including a proper subset of feature profiles of a model input processed by an implementation of a machine learning model, and a set of feature profiles defined by a model policy may include each feature profile of a model input processed by an implementation of a machine learning model (e.g., each feature profile of a feature input layer of the machine learning model, etc.).

As shown in FIG. 3, at step 306, process 300 includes providing an update for a second implementation of a machine learning model. For example, transaction service provider system 108 (e.g., data replicator system 154, etc.) may provide an update for a second implementation of a machine learning model. As an example, transaction service provider system 108 (e.g., data replicator system 154, etc.) may, in response to determining that the first model policy associated with the first machine learning model is satisfied, provide the plurality of first model states and the plurality of first feature profiles for updating at least one second implementation of the first machine learning model (e.g., at second data center 152*b*, etc.) different than the first implementation of the first machine learning model.

In some non-limiting embodiments or aspects, transaction service provider system 108 (e.g., data replicator system 154, etc.) may sort or group received model states and received feature profiles according to a sequence number of a model input associated with the model states and features profiles. For example, received model states and received feature profiles associated with a same sequence number (and/or with a same implementation of a same machine learning model) may be grouped together in a same group or message. As an example, a group of model states and feature profiles associated with the same sequence number may be represented by a bitmap, and each bit of the bitmap may provide an indication of whether an individual model state or feature profile has been received by data replicator system 154. As an example, transaction service provider system 108

(e.g., data replicator system 154, etc.) may provide a group or message for updating the at least one second implementation of the first machine learning model different than the first implementation of the first machine learning model in response to the model states, feature profile, and sequence number associated with that group or message satisfying the first model policy associated with the first machine learning model (e.g., in response the bitmap indicating that the first model states and first feature profiles defined by the first model policy have been received, etc.). In such an example, in response to the satisfaction of the first model policy at first data center 152*a*, data replicator system 154 may transmit or apply as an update, the message (e.g., the plurality of first model states and the plurality of first feature profiles, etc.) to second data center 152*b* for updating at least one second implementation of the first machine learning model different than the first implementation of the first machine learning model at second data center 152*b*.

In some non-limiting embodiments or aspects, a plurality of data centers may provide a plurality of implementations of one or more machine learning models. For example, and referring again to FIG. 1B, first data center 152*a* may provide a first implementation of a first machine learning model, second data center 152*b* may provide a second implementation of the first machine learning model, and/or n$^{th}$ data center 152*n* may provide an n$^{th}$ implementation of the first machine learning model. In some non-limiting embodiments or aspects, one or more of first data center 152*a*, second data center 152*b*, and third data center 152*n* may provide implementations of a plurality of different machine learning models (e.g., a first implementation of a first machine learning model at first data center 152*a*, a first implementation of a second machine learning model at first data center 152*a*, a second implementation of the first machine learning model at second data center 152*b*, a second implementation of the second machine learning model at second data center 152*b*, etc.). In such examples, transaction service provider system 108 (e.g., data replicator system 154, etc.) may receive model states and profile inputs associated with the plurality of implementations of the one or more machine learning models from the plurality of data centers 152*a*, 152*b*, 152*n* and may manage (e.g., provide, apply, etc.) updates of model states and profile inputs across each implementation of each machine learning model at each of plurality of data centers 152*a*, 152*b*, 152*n*.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method for managing stateful machine learning model updates across a plurality of data centers for processing electronic payment transactions in a transaction processing network comprising:

obtaining, with at least one processor, a plurality of first feature profiles input to a first implementation of a first machine learning model provided at a first data center of the plurality of data centers and a plurality of first model states determined from processing a model input including the plurality of first feature profiles with the first implementation of the first machine learning model provided at the first data center, wherein the plurality of first feature profiles includes transaction data associated with a plurality of first electronic payment transactions processed at the first data center by the first implementation of the first machine learning model;

delaying, with the at least one processor, updating at least one second implementation of the first machine learning model provided at a second data center of the plurality of data centers and different than the first implementation of the first machine learning model until a first model policy associated with the first machine learning model is satisfied;

sorting, with the at least one processor, received model states from the plurality of data centers and received feature profiles from the plurality of data centers according to sequence numbers of model inputs associated with the received model states and the received features profiles, wherein the received model states and the received feature profiles associated with a same sequence number are grouped together in a same group that is represented by a bitmap, and wherein each bit of the bitmap provides an indication of whether an individual model state or an individual feature profile has been received;

determining, with the at least one processor, according to the bitmap, that the first model policy associated with the first machine learning model is satisfied, based on the plurality of first model states including each model state of a set of model states defined by the first model policy, the plurality of first feature profiles including a set of feature profiles defined by the first model policy, and a sequence number associated with the model input including a next sequence number in an order of sequence numbers associated with model inputs processed by the first implementation of the machine learning model, wherein the first machine learning model includes a first neural network including a plurality of layers, and wherein each layer of the plurality of layers is associated with a different model state of the set of model states defined by the first model policy than each other layer of the plurality of layers;

in response to determining that the first model policy associated with the first machine learning model is satisfied, providing, with the at least one processor, a sorted group including the plurality of first model states and the plurality of first feature profiles for updating the at least one second implementation of the first machine learning model provided at the second data center of the plurality of data centers and different than the first implementation of the first machine learning model so that model states and/or input profiles for different implementations are updated consistently across the plurality of data centers to maintain accurate and consistent processing of the electronic payment transactions across the plurality of data centers, wherein the first machine learning model and the second machine learning model include stateful machine learning models; and after updating the at least one second implementation of the machine learning model provided at the second data center with the sorted group including the plurality of first model states and the plurality of first features profiles, processing, with the at least one processor, with the at least one second implementation of the machine learning model provided at the second data center, one or more current electronic payment transactions in the transaction processing network.

2. The computer-implemented method of claim 1, wherein the set of feature profiles defined by the first model policy includes a proper subset of feature profiles of the model input processed by the first implementation of the machine learning model.

3. The computer-implemented method of claim 1, wherein obtaining the plurality of first model states includes receiving at least one first model state of the plurality of first model states at a first time and receiving at least one other first model state of the plurality of model states at another time subsequent to the first time, wherein the at least one first model state includes a model state of the set of model states defined by the first model policy, and wherein the at least one other first model state includes another model state of the set of model states defined by the first model policy.

4. The computer-implemented method of claim 1, wherein obtaining the plurality of first feature profiles includes receiving at least one first feature profile of the plurality of first feature profiles at a first time and receiving at least one other first feature profile of the plurality of first feature profiles at another time subsequent to the first time, wherein the at least one first feature profile does not include a feature profile of the set of feature profiles defined by the first model policy, and wherein the at least one other first feature profile includes a feature profile of the set of feature profiles defined by the first model policy.

5. A computing system for managing stateful machine learning model updates across a plurality of data centers for processing electronic payment transactions in a transaction processing network, comprising:

one or more processors programmed and/or configured to:

obtain a plurality of first feature profiles input to a first implementation of a first machine learning model provided at a first data center of the plurality of data centers and a plurality of first model states determined from processing a model input including the plurality of first feature profiles with the first implementation of the first machine learning model provided at the first data center, wherein the plurality of first feature profiles includes transaction data associated with a plurality of first electronic payment transactions processed at the first data center by the first implementation of the first machine learning model;

delay updating at least one second implementation of the first machine learning model provided at a second data center of the plurality of data centers and different than the first implementation of the first machine learning model until a first model policy associated with the first machine learning model is satisfied;

sort received model states from the plurality of data centers and received feature profiles from the plurality of data centers according to sequence numbers of model inputs associated with the received model states and the received features profiles, wherein the received model states and the received feature profiles associated with a same sequence number are grouped together in a same group that is represented by a bitmap, and wherein each bit of the bitmap provides an indication of whether an individual model state or an individual feature profile has been received;

determine, according to the bitmap, that the first model policy associated with the first machine learning model is satisfied, based on the plurality of first model states including each model state of a set of model states defined by the first model policy, the plurality of first feature profiles including a set of feature profiles defined by the first model policy, and a sequence number associated with the model input including a next sequence number in an order of sequence numbers associated with model inputs processed by the first implementation of the machine learning model, wherein the first machine learning model includes a first neural network including a plurality of layers, and wherein each layer of the plurality of layers is associated with a different model state of the set of model states defined by the first model policy than each other layer of the plurality of layers;

in response to determining that the first model policy associated with the first machine learning model is satisfied, provide a sorted group including the plurality of first model states and the plurality of first feature profiles for updating the at least one second implementation of the first machine learning model provided at the second data center of the plurality of data centers and different than the first implementation of the first machine learning model so that model states and/or input profiles for different implementations are updated consistently across the plurality of data centers to maintain accurate and consistent processing of the electronic payment transactions across the plurality of data centers, wherein the first machine learning model and the second machine learning model include stateful machine learning models; and after updating the at least one second implementation of the machine learning model provided at the second data center with the sorted group including the plurality of first model states and the plurality of first features profiles, process, with the at least one second implementation of the machine learning model provided at the second data center, one or more current electronic payment transactions in the transaction processing network.

6. The computing system of claim 5, wherein the set of feature profiles defined by the first model policy includes a proper subset of feature profiles of the model input processed by the first implementation of the machine learning model.

7. The computing system of claim 5, wherein the one or more processors are programmed and/or configured to obtain the plurality of first model states by receiving at least one first model state of the plurality of first model states at a first time and receiving at least one other first model state of the plurality of model states at another time subsequent to the first time, wherein the at least one first model state includes a model state of the set of model states defined by the first model policy, and wherein the at least one other first model state includes another model state of the set of model states defined by the first model policy.

8. The computing system of claim 5, wherein the one or more processors are programmed and/or configured to obtain the plurality of first feature profiles by receiving at least one first feature profile of the plurality of first feature profiles at a first time and receiving at least one other first feature profile of the plurality of first feature profiles at another time subsequent to the first time, wherein the at least one first feature profile does not include a feature profile of the set of feature profiles defined by the first model policy, and wherein the at least one other first feature profile includes a feature profile of the set of feature profiles defined by the first model policy.

9. A computer program product comprising at least one non-transitory computer-readable medium including program instructions for managing stateful machine learning model updates across a plurality of data centers for processing electronic payment transactions in a transaction processing network that, when executed by at least one processor, cause the at least one processor to:

obtain a plurality of first feature profiles input to a first implementation of a first machine learning model provided at a first data center of the plurality of data centers and a plurality of first model states determined from processing a model input including the plurality of first feature profiles with the first implementation of the first machine learning model provided at the first data center, wherein the plurality of first feature profiles includes transaction data associated with a plurality of first electronic payment transactions processed at the first data center by the first implementation of the first machine learning model;

delay updating at least one second implementation of the first machine learning model provided at a second data center of the plurality of data centers and different than the first implementation of the first machine learning model until a first model policy associated with the first machine learning model is satisfied;

sort received model states from the plurality of data centers and received feature profiles from the plurality of data centers according to sequence numbers of model inputs associated with the received model states and the received features profiles, wherein the received model states and the received feature profiles associated with a same sequence number are grouped together in a same group that is represented by a bitmap, and wherein each bit of the bitmap provides an indication of whether an individual model state or an individual feature profile has been received;

determine, according to the bitmap, that the first model policy associated with the first machine learning model is satisfied, based on the plurality of first model states including each model state of a set of model states defined by the first model policy, the plurality of first feature profiles including a set of feature profiles defined by the first model policy, and a sequence number associated with the model input including a next sequence number in an order of sequence numbers associated with model inputs processed by the first implementation of the machine learning model, wherein the first machine learning model includes a first neural network including a plurality of layers, and wherein each layer of the plurality of layers is associated with a different model state of the set of model states defined by the first model policy than each other layer of the plurality of layers;

in response to determining that the first model policy associated with the first machine learning model is satisfied, provide a sorted group including the plurality of first model states and the plurality of first feature profiles for updating the at least one second implementation of the first machine learning model provided at the second data center of the plurality of data centers and different than the first implementation of the first machine learning model so that model states and/or input profiles for different implementations are updated consistently across the plurality of data centers to maintain accurate and consistent processing of the electronic payment transactions across the plurality of data centers, wherein the first machine learning model and the second machine learning model include stateful machine learning models; and after updating the at least one second implementation of the machine learning model provided at the second data center with the sorted group including the plurality of first model states and the plurality of first features profiles, processing, with the at least one processor, with the at least one second implementation of the machine learning model provided at the second data center, one or more current electronic payment transactions in the transaction processing network.

10. The computer program product of claim 9, wherein the set of feature profiles defined by the first model policy includes a proper subset of feature profiles of the model input processed by the first implementation of the machine learning model.

11. The computer program product of claim 9, wherein the instructions cause the at least one processor to obtain the plurality of first model states by receiving at least one first model state of the plurality of first model states at a first time and receiving at least one other first model state of the plurality of model states at another time subsequent to the first time, wherein the at least one first model state includes a model state of the set of model states defined by the first model policy, and wherein the at least one other first model state includes another model state of the set of model states defined by the first model policy.

12. The computer program product of claim 9, wherein the instructions cause the at least one processor to obtain the plurality of first feature profiles by receiving at least one first feature profile of the plurality of first feature profiles at a first time and receiving at least one other first feature profile of the plurality of first feature profiles at another time subsequent to the first time, wherein the at least one first feature profile does not include a feature profile of the set of feature profiles defined by the first model policy, and wherein the at least one other first feature profile includes a feature profile of the set of feature profiles defined by the first model policy.

* * * * *